(12) United States Patent
Akagi

(10) Patent No.: US 12,017,616 B2
(45) Date of Patent: Jun. 25, 2024

(54) HOOK STRUCTURE FOR HANGING AUTOMOBILE INTERIOR PART

(71) Applicant: KASAI KOGYO CO., LTD., Kanagawa (JP)

(72) Inventor: Haruki Akagi, Kawasaki (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 377 days.

(21) Appl. No.: 17/601,878

(22) PCT Filed: Jun. 3, 2019

(86) PCT No.: PCT/JP2019/021927
§ 371 (c)(1),
(2) Date: Oct. 6, 2021

(87) PCT Pub. No.: WO2020/245862
PCT Pub. Date: Dec. 10, 2020

(65) Prior Publication Data
US 2022/0203901 A1    Jun. 30, 2022

(51) Int. Cl.
*B60R 7/08* (2006.01)
(52) U.S. Cl.
CPC ..................... *B60R 7/08* (2013.01)
(58) Field of Classification Search
CPC .... B60R 7/08; B60R 7/04; B60R 3/02; B60R 11/0258

(Continued)

(56) References Cited

U.S. PATENT DOCUMENTS 3,418,681 A * 12/1968 Szabo .................... A45C 13/22
16/405
6,457,690 B1 * 10/2002 Spykerman ............... B60R 7/10
224/313

(Continued)

FOREIGN PATENT DOCUMENTS

CN    101423041 A    5/2009
CN    104354617 A    2/2015

(Continued)

OTHER PUBLICATIONS

Chinese Office Action mailed on Aug. 10, 2023 in a corresponding Chinese Patent Application No. 201980094839.7 (7 pages).

(Continued)

*Primary Examiner* — Pinel E Romain
(74) *Attorney, Agent, or Firm* — United IP Counselors, LLC

(57) ABSTRACT

A load-hanging hook structure of an automobile interior component includes an opening formed in the automobile interior component, and a hook provided at a position slightly shifted out from the opening. The hook includes a hook portion extending in a width direction of the opening, a first support portion shaped so as to extend from the hook portion and be linked to an inner upper edge portion of the opening, and a second support portion shaped so as to extend from the hook portion and be linked to an inner lower edge portion of the opening. The hook is structured such that the hook portion is supported by the first and second support portions from sides of both of the inner upper and lower edge portions of the opening.

3 Claims, 9 Drawing Sheets

(58) Field of Classification Search
USPC .............................................. 296/1.07, 24.3
See application file for complete search history.

(56) References Cited

U.S. PATENT DOCUMENTS

| | | | | |
|---|---|---|---|---|
| 6,663,067 | B2* | 12/2003 | Gordon | B60R 7/10 |
| | | | | 248/304 |
| 7,644,972 | B2* | 1/2010 | Lim | B60R 11/00 |
| | | | | 296/37.1 |
| 9,914,399 | B2* | 3/2018 | Lewis | B60R 5/04 |
| 10,081,305 | B2* | 9/2018 | Brown | B60R 11/00 |
| 2009/0108149 | A1 | 4/2009 | Goto | |
| 2017/0001571 | A1* | 1/2017 | Cho | B60R 5/00 |
| 2017/0106804 | A1* | 4/2017 | Jinyun | B60R 11/0258 |

FOREIGN PATENT DOCUMENTS

| | | | | |
|---|---|---|---|---|
| CN | 104723972 A | * | 6/2015 | |
| GB | 2454291 A | | 5/2009 | |
| JP | 2003095002 A | * | 4/2003 | ............. B60N 3/102 |
| JP | 2009-107462 A | | 5/2009 | |
| JP | 2009-166429 A | | 7/2009 | |
| JP | 2015-074329 A | | 4/2015 | |
| JP | 2018-103811 A | | 7/2018 | |

OTHER PUBLICATIONS

International Search Report for International Application No. PCT/JP2019/021927 dated Jul. 2, 2019, Japan, 1 page.

* cited by examiner

HOOK STRUCTURE FOR HANGING AUTOMOBILE INTERIOR PART

CROSS-REFERENCE TO RELATED APPLICATIONS

This application is a National Stage Entry application of PCT International Application No. PCT/JP2019/021927, filed on Jun. 3, 2019, the entire contents of which are hereby incorporated by reference.

BACKGROUND

1. Technical Field

The present invention relates to a structure (hereinafter, referred to as "load-hanging hook structure") that enables a shopping bag or the like to be hooked in an automobile interior component. Particularly, the present invention relates to the structure that is compact, superior in rigidity, and suitable for reducing a weight, the number of parts, and cost of the entire automobile interior component.

2. Description of the Background

Conventionally, a load-hanging hook structure is applied to such a type of automobile interior component (e.g., refer to a hook (4) in a vehicle interior component (1) disclosed in Japanese Patent Application Laid-open Publication No. 2015-74329 (hereinafter referred to as "Patent Literature 1"). An example of the automobile interior component is a side trim that constitutes an inner side surface of a luggage room.

FIG. 6A is an illustration of a conventional load-hanging hook structure. FIG. 6B is a D-arrow sectional view in FIG. 6A.

Referring to FIG. 6A and FIG. 6B, the conventional load-hanging hook structure 30 includes an opening 4 and a hook 5. The opening 4 is formed in an automobile interior component 1. The hook 5 is provided at a position slightly shifted out from the opening 4. The hook 5 is constituted by a hook portion 50 and a support piece 54. The hook portion 50 extends in a width direction of the opening 4. The support piece 54 is shaped so as to extend from the hook portion 50 and be linked to an inner lower edge portion of the opening 4.

Incidentally, there is a case where a straight-line distance L1 from a distal end of the support piece 54 to the vicinity of its root is long as illustrated in FIG. 7 for example, in the conventional load-hanging hook structure 30 described above. In this case, a stress concentrates near the root of the support piece 54 when a shopping bag or the like is hooked on the hook portion 50. Thus, the support piece 54 becomes more easily breakable from the vicinity of its root.

A structure (hereinafter, referred to as "conventional first structure") where the entire support piece 54 is formed in a crank shape as illustrated in FIG. 8A and in FIG. 8B is conventionally applied in order to solve the above-described deficiency (breaking of the support piece 54). Thereby, rigidity of the support piece 54 is enhanced. In addition to this, a structure (hereinafter, referred to as "conventional second structure") where large arc portions having round shapes are formed near the root of the support piece 54 as illustrated in FIG. 9A and FIG. 9B is conventionally applied in order to solve the above-described deficiency. Thereby, a stress concentrating near the root of the support piece 54 is dispersed.

However, when the conventional first and second structures described above are applied, a longitudinal-direction (up-down direction) straight-line distance from the vicinity of the root of the support piece 54 to the distal end of the hook portion 50 is increased by H1+H2 in FIG. 9A and FIG. 9B because of the above-described crank shape and round shapes. This is understood also from comparison of FIG. 7 with FIG. 8A and FIG. 8B or with FIG. 9A and FIG. 9B. When the support piece 54 and the hook portion 50 are formed with a mold, a size of a longitudinal-direction (up-down direction) straight-line length of the opening 4 also is set long so as to be adapted to such a longitudinal-direction (up-down direction) straight-line distance. Further, the support piece 54 has a wider width near its root because of the round shapes. Accordingly, a size of a lateral-direction (width direction) length of the opening 4 is set long so as to be adapted to such a wider width. For these reasons, the entire load-hanging hook structure 30 unavoidably becomes large in size when the above-described conventional first and second structures are applied to the conventional load-hanging hook structure 30.

It is considered that the conventional load-hanging hook structure 30 has a configuration (hereinafter, referred to as "additional-component installation method") where an additional component such as a bracket is arranged on a back surface of the hook 5, as a means for enhancing rigidity of the entire hook 5 (e.g., refer to "backing hook 13" disclosed in Patent Literature 1). However, this additional-component installation method uses the additional component and a still additional component for attaching the additional component. This accordingly causes a problem that a weight and the number of parts of the entire automobile interior component are increased and a problem that cost of the automobile interior component is increased.

BRIEF SUMMARY

The present invention has been made to solve the above-described problem. An object of the present invention is to provide a load-hanging hook structure that belongs to an automobile interior component and that is compact, superior in rigidity, and suitable for reducing a weight, the number of parts, and cost of the entire automobile interior component.

In order to accomplish the above-described object, the present invention includes: an opening formed in an automobile interior component; and a hook provided at a position slightly shifted out from the opening, wherein the hook includes: a hook portion extending in a width direction of the opening; a first support portion shaped so as to extend from the hook portion and be linked to an inner upper edge portion of the opening; and a second support portion shaped so as to extend from the hook portion and be linked to an inner lower edge portion of the opening, and the hook is structured such that the hook portion is supported by the first and second support portions from sides of both of the inner upper and lower edge portions of the opening.

In the present invention, flange portions may be formed at back-surface upper and lower edge portions of the hook portion.

In the present invention, a longitudinal rib may be provided at a back surface of the hook.

In the present invention, the longitudinal rib may be shaped so as to longitudinally traverse the hook portion and the first and second support portions and reach the inner upper edge portion and the inner lower edge portion of the opening.

According to the present invention, the hook applied as a specific load-hanging hook structure in an automobile interior component is structured such that the hook portion is supported by the first and second support portions from sides of both of the inner upper and lower edge portions of the opening, as described above. Therefore, the following advantageous effects 1 to 3 and the like can be achieved.

Advantageous Effect 1

According to the present invention, the hook portion of the hook is supported by the first and second support portions. Accordingly, rigidity of the entire hook against loading can be sufficiently secured even when the entire load-hanging hook structure is made smaller in size than that in the case of a conventional hook in which a hook portion is supported by one support portion. Thus, the load-hanging hook structure belonging to the automobile interior component and superior in rigidity can be provided.

Advantageous Effect 2

According to the present invention, a stress generated in the hook (the hook portion and the support portions for this) by loading is dispersed to vicinities of roots of the first and second support portions without concentrating at one place. In other words, the stress is dispersed to both of the inner upper and lower edge portions of the opening (dispersed to upper and lower sides of the hook). Thereby, the stress is eased.
Accordingly, it is unnecessary to take, against such a stress, conventional measures (e.g., a measure in which an entire support portion is formed in a crank shape and a measure in which large arc portions having round shapes are formed near width-direction both-side edge portions of an opening). Thus, a width and a height of the opening can be set smaller than those in the conventional case. In this respect, it is possible to provide the load-hanging hook structure belonging to the automobile interior component, suitable for compactly configuring the entire load-hanging hook structure, and suitable for improving a degree of freedom in designing around the load-hanging hook structure.

Advantageous Effect 3

According to the present invention, rigidity of the entire hook against loading can be sufficiently secured even when the entire load-hanging hook structure is made small in size, as described above. Accordingly, it is unnecessary to take a conventional measure (providing of an additional component) for securing the rigidity. In this respect, the load-hanging hook structure suitable for reducing a weight, the number of parts, and cost of the entire automobile interior component can be provided.

DETAILED DESCRIPTION

The following describes the best mode for carrying out the present invention, in detail with reference to the accompanying drawings.

Figure 1:
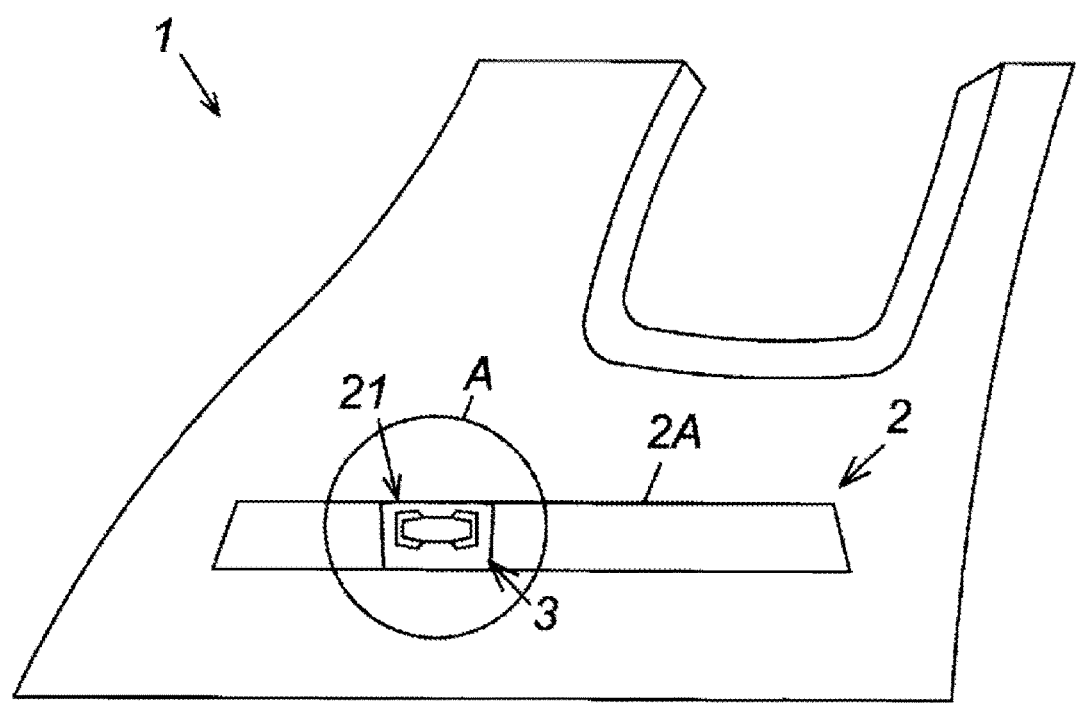
FIG. 1 is a schematic view of an entire automobile interior component to which a load-hanging hook structure of the present invention has been applied.
Figure 2:
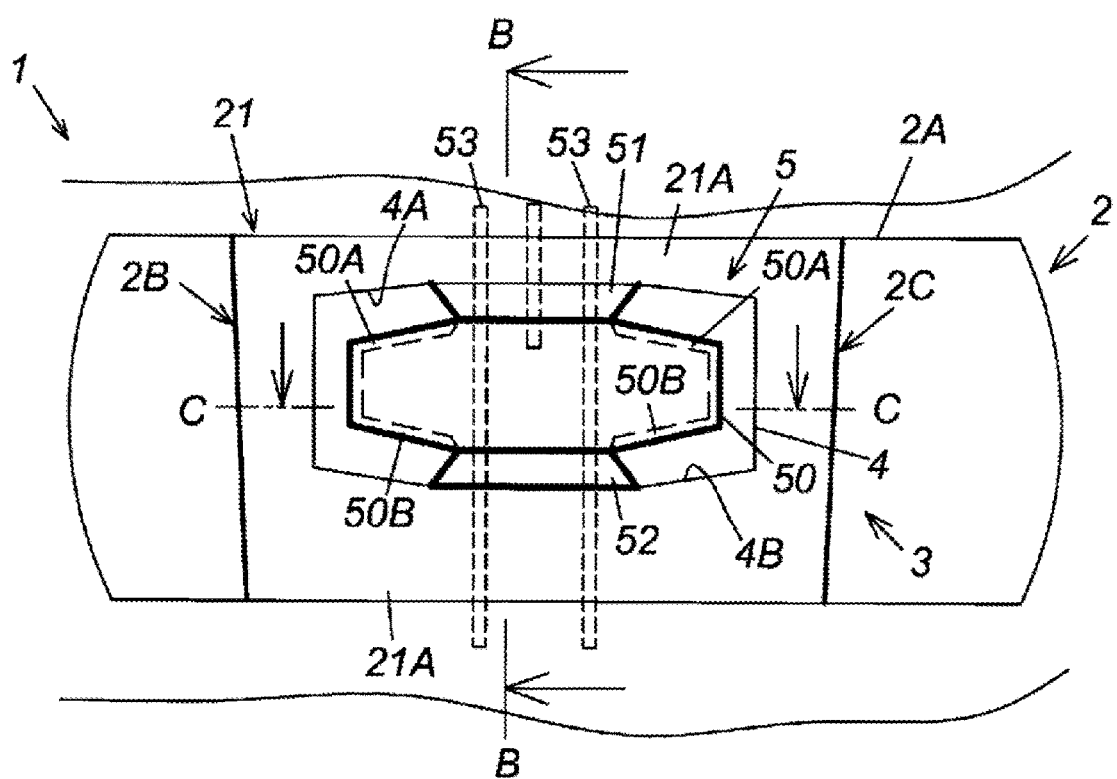
FIG. 2 is an enlarged view of the vicinity of the part A in FIG. 1.
Figure 3:
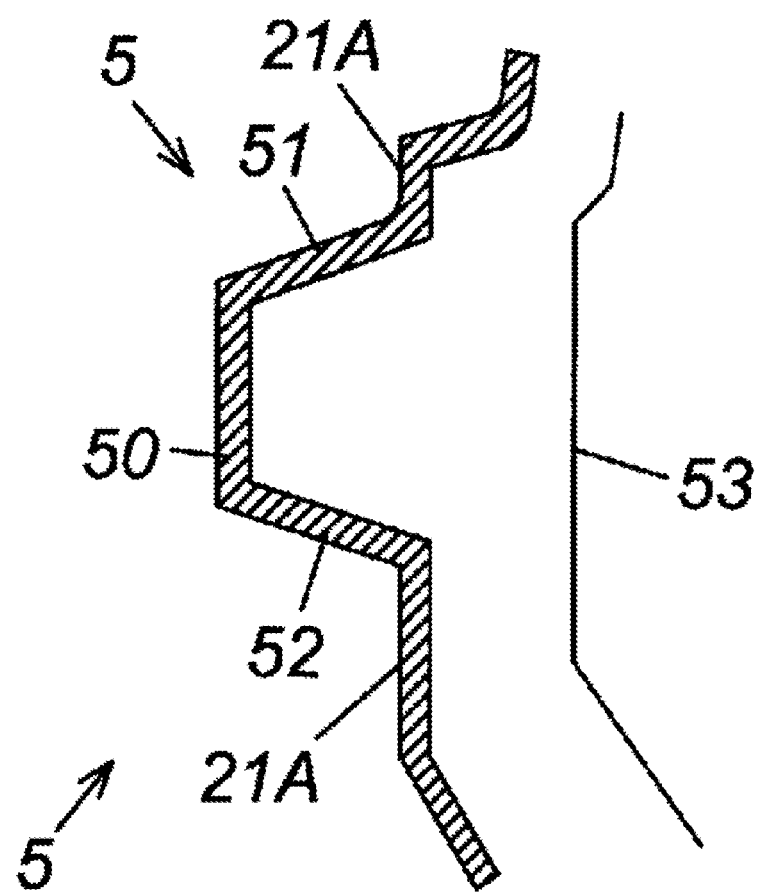
FIG. 3 is a B-arrow sectional view in FIG. 2.
Figure 4:
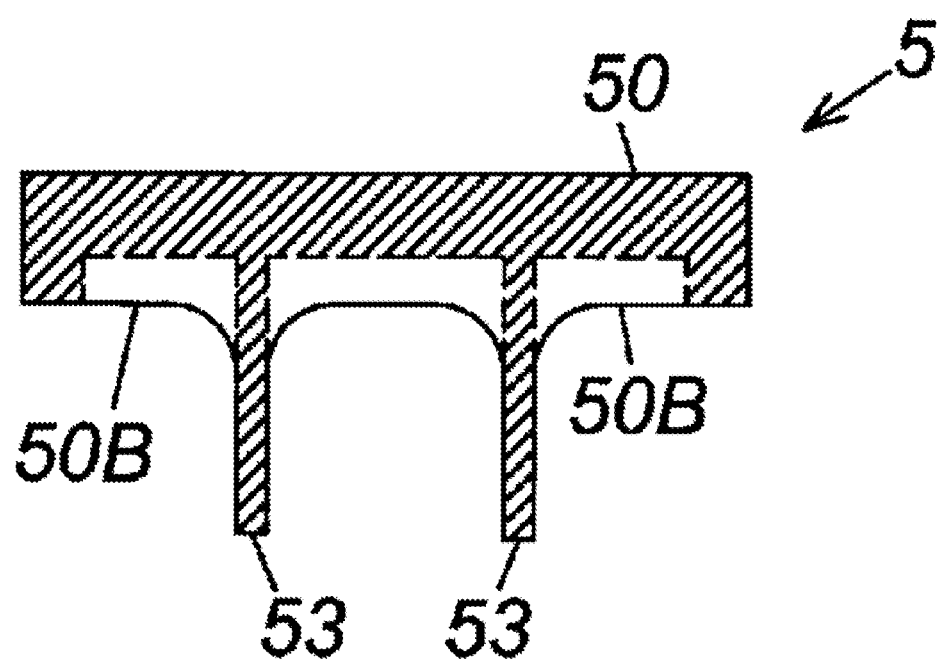
FIG. 4 is a C-arrow sectional view in FIG. 2.
Figure 5:
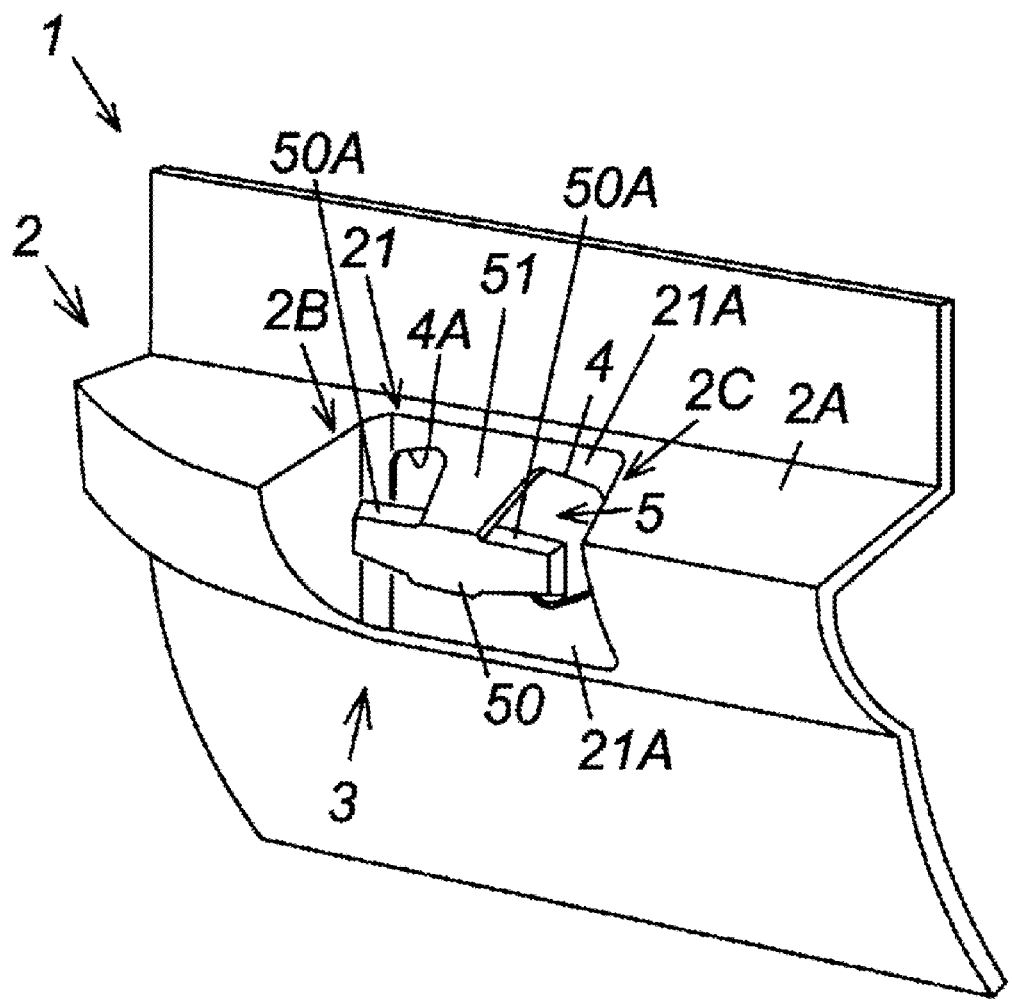
FIG. 5 is an enlarged perspective view of the vicinity of the part A in FIG. 1.

FIG. 1 is a schematic view of an entire automobile interior component to which a load-hanging hook structure of the present invention has been applied. FIG. 2 is an enlarged view of the vicinity of the part A in FIG. 1. FIG. 3 is a B-arrow sectional view in FIG. 2. FIG. 4 is a C-arrow sectional view in FIG. 2. FIG. 5 is an enlarged perspective view of the vicinity of the part A in FIG. 1.

The automobile interior component 1 of FIG. 1 is formed as a side trim of a luggage room. The automobile interior component 1 is formed of resin so as to have an intended shape. The automobile interior component 1 is attached to a vehicle body panel (not illustrated) positioned at a side surface of the luggage room, thereby constituting an inner side surface of the luggage room.

A rest portion 2 is provided in the automobile interior component 1 of FIG. 1, as a means with which an un-illustrated known tonneau cover spread inside the luggage room is stably arranged without fluttering. The rest portion 2 is shaped so as to elongate in a rail shape in a front-rear direction of the automobile. The rest portion 2 is further shaped so as to protrude, by a predetermined amount, toward an inside of the luggage room from a design surface (specifically, a surface facing the inside of the luggage room and hereinafter referred to as "vehicle-inside design surface") of the automobile interior component 1. An edge portion of the tonneau cover spread inside the luggage room is placed on an upper surface 2A of the rest portion. Thereby, the tonneau cover can be stably arranged without fluttering, so as to cover the entire luggage room.

The load-hanging hook structure 3 (a structure that enables hooking of a shopping bag or the like) illustrated in FIG. 2 has been applied to the automobile interior component 1 of FIG. 1.

The load-hanging hook structure 3 is incorporated into the above-described rest portion 2 in the automobile interior component 1 of FIG. 1 in an application example of incorporating the load-hanging hook structure 3 into the automobile interior component 1. In other words, the automobile interior component 1 of FIG. 1 is configured as follows. Two level differences 2B and 2C are provided on a side surface of the rest portion 2, thereby forming a recess portion 21 (this recess portion 21 also constitutes the vehicle-inside design surface of the automobile interior component 1). Further, an opening 4 is formed on a flat surface portion 21A that is a bottom of the recess portion 21. Furthermore, a hook 5 is shaped so as to extend from inner edge portions of the opening 4. However, the automobile interior component 1 is not limited to this configuration. The load-hanging hook structure 3 of FIG. 2 may be incorporated at a place that is included in the entire automobile interior component 1 of FIG. 1 and that is other than the rest portion 2. Alternatively, the load-hanging hook structure 3 of FIG. 2 may be incorporated into an automobile interior component other than a side trim of a luggage room such as one of FIG. 1.

With reference to FIG. 2 and FIG. 5, the load-hanging hook structure 3 of FIG. 2 is configured so as to include the opening 4 and the hook 5. The opening 4 is formed in the automobile interior component 1. The hook 5 is provided at a position slightly shifted from the opening 4 to an outside (specifically, to a vehicle inside). The hook 5 is provided at this position in order to enable a shopping bag or the like to be easily hooked on it.

The hook 5 is structured so as to include a hook portion 50, a first support portion 51, and a second support portion 52. The hook portion 50 extends in a width direction of the opening 4. The first support portion 51 is shaped so as to extend from the hook portion 50 and be linked to an inner upper edge portion 4A of the opening 4. The second support portion 52 is shaped so as to extend from the hook portion 50 and be linked to an inner lower edge portion 4B of the opening 4. The hook portion 50 in this structure is supported by the first and second support portions 51 and 52 from sides of both of the inner upper and lower edge portions 4A and 4B of the opening 4.

Flange portions 50A and 50B (refer to FIG. 2 and FIG. 4) are formed at back-surface upper and lower edge portions of the hook portion 50 in the automobile interior component 1 of FIG. 1, in a specific configuration example of the hook 5. Thereby, rigidity of the entire hook 5 is enhanced. Thus, it is unnecessary to take conventional measures against a stress generated in the entire hook 5 by loading. Examples of the conventional measures include a measure in which large arc portions having round shapes are formed near width-direction both-side edge portions of the opening 4, and a measure in which rigidity-strengthening flanges are provided near roots of the support portions 51 and 52.

Figure 6A:
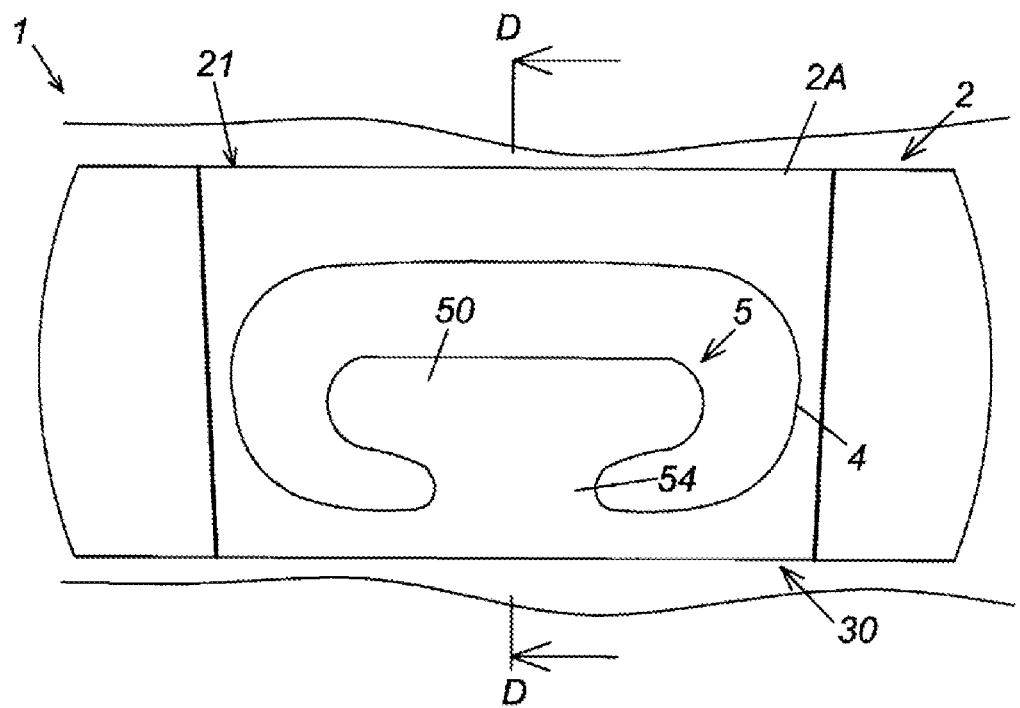
FIG. 6A is an illustration of a conventional load-hanging hook structure.
Figure 6B:
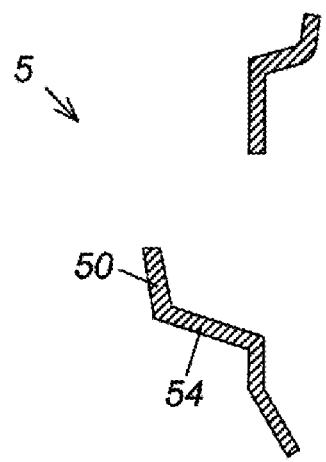
FIG. 6B is a D-arrow sectional view in FIG. 6A.
Figure 7:
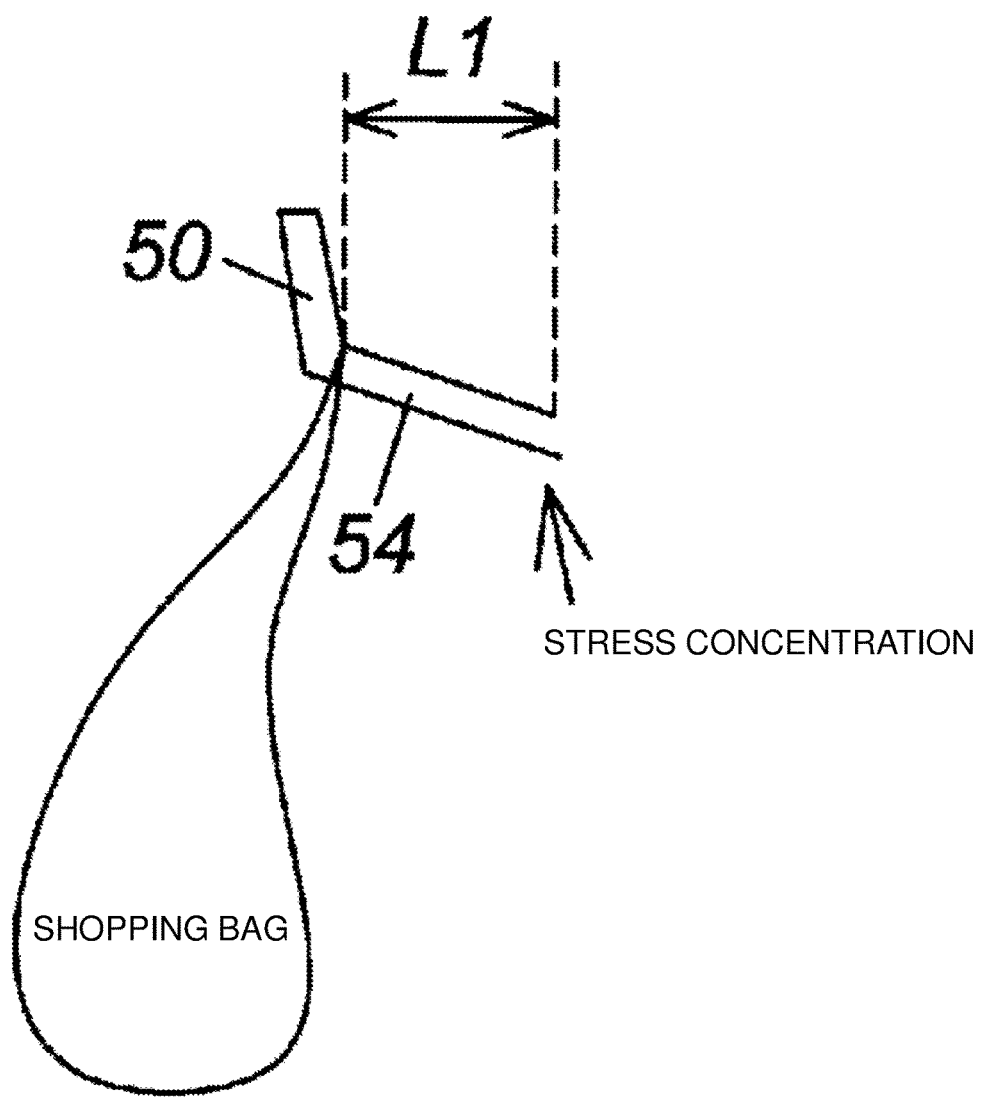
FIG. 7 is an illustration of stress concentration in the conventional load-hanging hook structure.
Figure 8A:
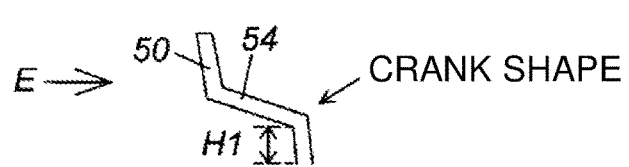
FIG. 8A is an illustration of a configuration for enhancing rigidity of a hook.
Figure 8B:
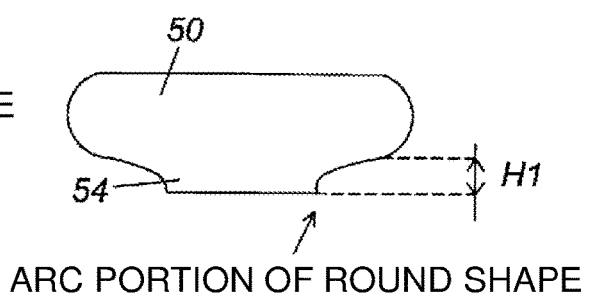
FIG. 8B is an E-arrow view in FIG. 8A.
Figure 9A:
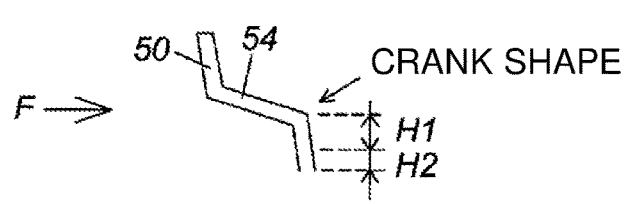
FIG. 9A is an illustration of a structure for enhancing rigidity of a hook.
Figure 9B:
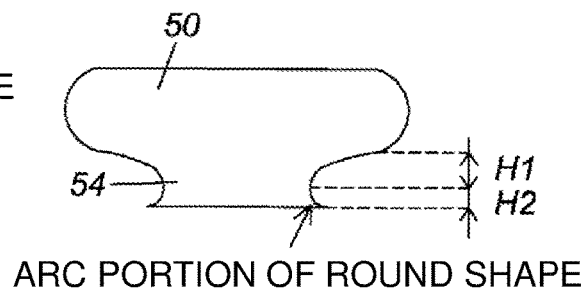
FIG. 9B is an F-arrow view in FIG. 9A.

According to the load-hanging hook structure 3 of FIG. 2, the hook 5 includes, as its basic structure, a structure in which the hook portion 50 is supported by the first and second support portions 51 and 52 as described above. Accordingly, rigidity of the entire hook 5 against loading is sufficiently secured even when the entire load-hanging hook structure 3 is made smaller in size than that in the case of a conventional hook. The conventional hook includes a hook portion supported by only one support piece 54 (refer to FIG. 6A and FIG. 6B).

Longitudinal ribs 53 (refer to FIG. 3 and FIG. 4) are further provided, as a means for further enhancing rigidity of the entire hook 5, on the back surface of the hook 5 in the load-hanging hook structure 3 of FIG. 2. The longitudinal rib 53 is shaped so as to longitudinally traverse the hook portion 50 and the first and second support portions 51 and 52 and reach vicinities of the inner upper edge portion 4A and the inner lower edge portion 4B of the opening 4.

Although FIG. 2 and FIG. 4 illustrate an example in which the two longitudinal ribs 53 are provided in parallel to each other, a configuration is not limited to this example. Concerning the configuration of the longitudinal ribs 53, the number, an arrangement interval, or the like of the longitudinal ribs 53 can be increased or decreased appropriately depending on necessity.

The two support portions 51 and 52 in the load-hanging hook structure 3 of FIG. 2 are shaped so as to incline by a predetermined amount from and protrude from the vehicle-inside design surface of the automobile interior component 1 toward the inside of the luggage room. Thereby, the hook portion 50 is arranged at the position slightly shifted out from the vehicle-inside design surface of the automobile interior component 1 in the vehicle-inside direction ("the direction to the inside of the luggage room" in the example of FIG. 1). This is intended to enable a load such as a shopping bag to be easily hooked on it as described above.

According to the load-hanging hook structure 3 of FIG. 2, a stress generated in the entire hook 5 (the hook portion 50 and the first and second support portions 51 and 52) by loading is dispersed to vicinities of the roots of the first and second support portions 51 and 52 without concentrating at one place, because of the structure of the hook 5. In other words, the stress is dispersed to both of the inner upper and lower edge portions of the opening 4 (dispersed to upper and lower sides of the hook 5). Thereby, the stress is eased. Accordingly, it is unnecessary to take, against such a stress, conventional measures (e.g., a measure in which an entire support portion is formed in a crank shape and a measure in which large arc portions having round shapes are formed near width-direction both-side edge portions of an opening). Thus, a width and a height of the opening 4 can be set smaller than those in the conventional case. In this respect, there is an advantage that the entire load-hanging hook structure 3 can be compactly configured, and a degree of freedom in designing around the load-hanging hook structure 3 is high.

The load-hanging hook structure 3 of FIG. 2 can sufficiently secure rigidity of the entire hook 5 against loading even when the entire structure 3 is made small in size. Accordingly, it is unnecessary to take a conventional measure (providing of an additional component) for securing such rigidity. In this respect, the load-hanging hook structure 3 is suitable for reducing a weight, the number of parts, and cost of the entire automobile interior component.

According to the load-hanging hook structure 3 of FIG. 2, rigidity of the entire hook 5 is substantially determined by sectional shapes, sizes, materials, and the like of the first and second support portions 50 and 51. The sufficient rigidity can be secured in the entire hook 5 even in the case of changing an inclination angle (hereinafter, referred to as "face angle") of the hook portion 50 from the flat surface portion 21A at the perimeter edge of the opening 4. Thus, there is also an advantage that such a face angle can be relatively freely set.

The present invention is not limited to the above-described embodiment. A person ordinarily skilled in the art can make various modifications within the technical idea of the present invention.

REFERENCE SIGNS LIST

1 Automobile interior component
2 Rest portion
2A Upper surface of rest portion
2B, 2C Level difference
21 Recess portion
21A Flat surface portion
3 Load-hanging hook structure
30 Conventional load-hanging hook structure
4 Opening
5 Hook
50 Hook portion
50A, 50B Flange portion
51 First support portion
52 Second support portion
53 Longitudinal rib
54 Support piece

The invention claimed is:

1. A load-hanging hook structure of an automobile interior component, comprising:
    an opening formed in the automobile interior component; and
    a hook provided at a position slightly shifted out from the opening,
    wherein the hook includes a hook portion extending in a width direction of the opening, a first support strut shaped so as to extend from the hook portion and be attached to an inner upper edge portion of the opening, and a second support strut shaped so as to extend from the hook portion and be attached to an inner lower edge portion of the opening, longitudinal ends of the hook portion extending in the width direction beyond the first and second support struts,
    the hook is structured such that the hook portion is supported by the first and second support strut from sides of both of the inner upper and lower edge portions of the opening, and
    flange portions are formed at back-surface upper and lower edge portions of the hook portion.

2. A load-hanging hook structure of an automobile interior component, comprising:
    an opening formed in the automobile interior component; and
    a hook provided at a position slightly shifted out from the opening,
    wherein the hook includes a hook portion extending in a width direction of the opening, a first support strut shaped so as to extend from the hook portion and be attached to an inner upper edge portion of the opening, and a second support strut shaped so as to extend from the hook portion and be attached to an inner lower edge portion of the opening, longitudinal ends of the hook portion extending in the width direction beyond the first and second support struts,
    the hook is structured such that the hook portion is supported by the first and second support strut from sides of both of the inner upper and lower edge portions of the opening, and
    a longitudinal rib is provided at a back surface of the hook.

3. The load-hanging hook structure of the automobile interior component according to claim 2,
    wherein the longitudinal rib is shaped so as to longitudinally traverse the hook portion and the first and second support portions and reach the inner upper edge portion and the inner lower edge portion of the opening.

* * * * *